United States Patent [19]

Namiki et al.

[11] Patent Number: 4,627,406
[45] Date of Patent: Dec. 9, 1986

[54] OIL SEPARATOR FOR RECYCLED BLOW-BY GAS

[75] Inventors: Kyoji Namiki, Urawa; Shunji Abe, Kawagoe; Shigeki Yamashita, Higashimatsuyama; Yukio Kashiwaba, Saitama, all of Japan

[73] Assignee: Kabushiki Kaisha Tsuchiya Seisakusho, Tokyo, Japan

[21] Appl. No.: 678,466

[22] Filed: Dec. 5, 1984

[51] Int. Cl.[4] .............................. F02B 25/06
[52] U.S. Cl. .................... 123/573; 123/572; 55/322; 55/446
[58] Field of Search .......... 123/573, 572, 574; 55/320, 322, 446, 445

[56] References Cited

U.S. PATENT DOCUMENTS

| | | | |
|---|---|---|---|
| 1,739,093 | 12/1929 | Ruby | 55/322 |
| 2,885,027 | 5/1959 | Green | 55/446 |
| 3,266,474 | 8/1966 | Crandall | 123/572 |
| 3,326,198 | 6/1967 | Jackson et al. | 123/572 |
| 3,875,916 | 4/1975 | Patton | 123/573 |
| 4,283,209 | 8/1981 | Schmalhofer | 55/445 |

FOREIGN PATENT DOCUMENTS

| | | | |
|---|---|---|---|
| 1028349 | 11/1950 | France | 55/320 |
| 183218 | 12/1983 | Japan . | |
| 183917 | 12/1983 | Japan . | |
| 59-70824 | 4/1984 | Japan | 123/572 |

Primary Examiner—Magdalen Y. C. Greenlief
Attorney, Agent, or Firm—Schwartz, Jeffery, Schwaab, Mack, Blumenthal & Evans

[57] ABSTRACT

An oil separator element is housed in a casing of an oil separator and consists of alternatively aligned perforated plates and plate type filter members. Adjacent perforated plates are respectively formed with perforated sections which are located opposite to each other relative to an imaginery vertical plane containing a casing longitudinal axis. A space between neighboring perforated plate and filter member is larger on the downstream side than that on the upstream side. Additionally, each filter member is formed of a three dimensional porous material having an inner structure by which oil mist can effectively coalesce.

12 Claims, 11 Drawing Figures

OIL SEPARATOR FOR RECYCLED BLOW-BY GAS

BACKGROUND OF THE INVENTION

1. Field of the Invention

This invention relates to an oil separator for separating engine lubricating oil from blow-by gas recycled back to engine combustion chambers through an intake system.

2. Description of the Prior Art

Modern automotive engines including gasoline-fueled engines and diesel engines are usually provided with a so-called PCV (Positive Crankcase Ventilation) system for the purpose of exhaust emission control. The PCV system consists of a PCV valve which is disposed in a blow-by gas recirculation line connecting a crankcase chamber (or a cylinder head cover chamber) and an intake manifold to control the amount of the recycled blow-by gas, so that the blow-by gas leaking within the engine is recycled back to engine combustion chambers via an intake system. In such a PCV system, if the blow-by gas is recycled as it is, engine lubricating oil in the state of mist and carbon particles contained in the blow-by gas will be adhered to the inner wall surface of pipings and various control members of engine control systems exposed to the recycled blow-by gas, thereby giving rise to various problems in engine control. In order to prevent such problems, it has been already proposed to provide an oil separator in the blow-by gas recirculation line downstream of the PCV valve to separate the lubricating oil mist and the carbon particles. A variety of oil separators are put into practical use in which most ones employ baffle plates and/or steel wool as an oil separating element. However, such oil separators are lower in oil separating efficiency, thereby still leaving the above-mentioned problem due to lubricating oil mist and carbon particles. In this regard, it is eagerly desired to obtain an oil separator of a high oil separating efficiency.

SUMMARY OF THE INVENTION

An oil separator of the present invention consists of perforated plates and plate type filter members which are housed in a casing and alternatively aligned to be spaced from each other. Each perforated plate is formed with a perforated section having many small perforations. The perforation sections of respective adjacent perforated plates are located opposite to each other with respect to a longitudinal axis of the casing. A space defined between the perforated plate and the filter member located on the downstream side relative to the flow of recycled blow-by gas is larger than a space defined between the perforated plate and the filter member and located on the upstream side. A blow-by gas outlet is provided on the downstream side while a blow-by gas inlet is provided on the upstream side. Additionally, each filter member is formed of a three dimensional porous material having an inner structure by which oil mist in the blow-by gas can coalesce.

Accordingly, the blow-by gas introduced into the casing can become of the form of spout under the action of the small perforations, thus striking at a high speed against the filter member to permeate thereinto moving toward the downstream side. Oil droplets and mist contained in the blow-by gas are effectively caught by the inner structure of the filter member, thereby allowing them to coalesce to form large oil droplets. Such oil separation from the blow-by gas is further promoted by turning the stream of the blow-by gas between the adjacent perforated plates under the action of the oppositely located perforated sections of the adjacent perforated plates.

BRIEF DESCRIPTION OF THE DRAWINGS

The features and advantages of the oil separator of the present invention will be more clearly appreciated from the following description taken in conjunction with the accompanying drawings in which like reference numerals designate like parts and elements, and in which.

DETAILED DESCRIPTION OF THE INVENTION

Figure 1:
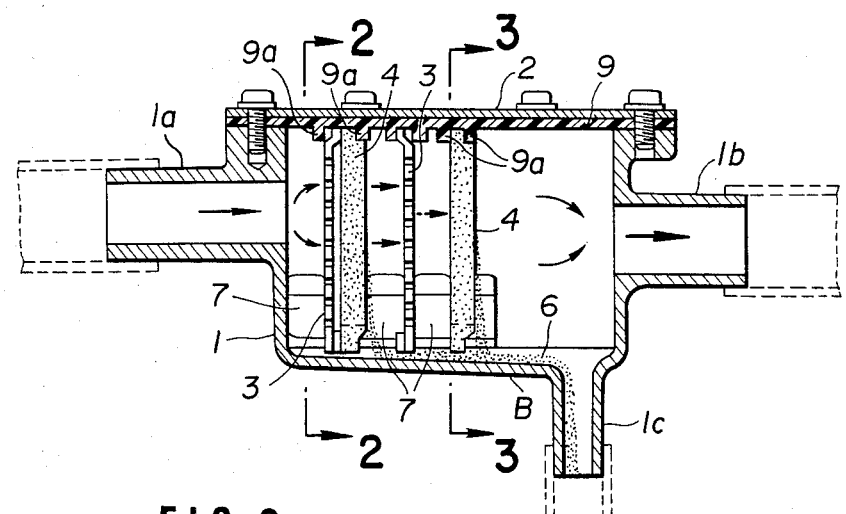
FIG. 1 is a vertical sectional view of an embodiment of oil separator of the present invention.
Figure 2:
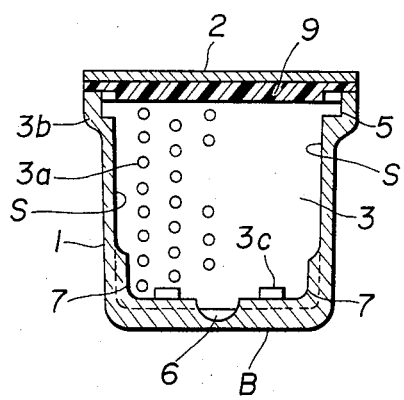
FIG. 2 is a sectional view taken in the direction of arrows substantially along the line 2—2 of FIG. 1.
Figure 3:
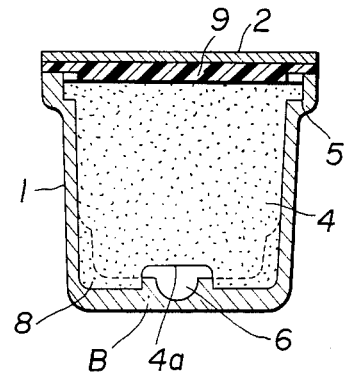
FIG. 3 is a sectional view taken in the direction of arrows substantially along the line 3—3 of FIG. 1.

Referring now to FIGS. 1 to 4, there is shown an embodiment of an oil separator in accordance with the present invention, for separating small droplets and mist of engine lubricating oil and carbon particles from blow-by gas recycled back to combustion chambers of an automotive internal combustion engine. The oil separator comprises a casing 1 which is opened at its top and provided at one end thereof with an inlet pipe 1a and at the other thereof with an outlet pipe 1b. The inlet pipe 1a is connected to the chamber of a crankcase (not shown) or the chamber of a cylinder head cover (not shown) via a blow-by gas recirculation line or pipe indicated in phantom. The outlet pipe 1b is connected to an intake manifold (not shown) via the pipe indicated in phantom. Additionally, the casing 1 is provided at its bottom wall B with an oil return pipe 1c which is located on the side of the outlet pipe 1b and connected to the crankcase via a pipe indicated in phantom.

The bottom wall B is formed on its upper surface with a longitudinal groove 6 which is located at the central portion of the bottom wall surface and extends along the longitudinal direction of the casing 1. A plurality of vertical ribs 7 are formed on the bottom wall B at the front half section. In this case, the term "front" or "forward" means an upstream location relative to the flow of blow-by gas indicated by arrows in FIGS. 1 and 5, and therefore the term "rear" or "rearward" means a downstream location relative to the blow-by gas flow. Each rib 7 extends along the opposite side walls S of the casing 1. Additionally, a plurality of lateral grooves 6 are formed on the bottom wall B in such a manner that each groove is defined between the adjacent ribs 7. Each rib 7 and each lateral groove 8 are so located that as to be perpendicular to longitudinal groove 6. It is to be noted that the fore-most rib 7 and the fore-most lateral groove 8A are slightly larger in width than the other ribs and the lateral grooves located rearward thereof.

A plurality of metal perforated plates 3 and filter plates (or plate type filter members) are disposed within the casing 1 at the front half section in such a manner that each perforated plate 3 and each filter plate 4 are alternately located at predetermined intervals. In this embodiment, the adjacent forward perforated plate 3 and forward filter plate 4 are positioned in the foremost wider lateral groove 8, while the rearward perforated plate 3 and the rearward filter plate 4 are positioned in the middle lateral groove 8 and the rearmost lateral groove 8, respectively. The filter plate 4 is formed of a three dimensional porous metal or plastic material. Preferably, the filter plate 4 is formed of a high porosity metal which is available under the trade name of "CELMET" and produced by Sumitomo Electric Industries Ltd. in Japan.

Figure 5:
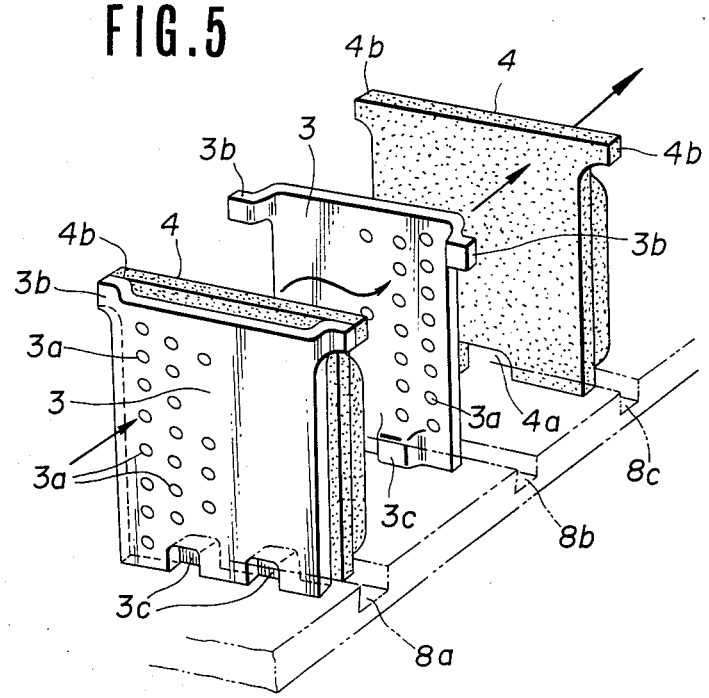
FIG. 5 is a perspective exploded view of an oil separating element housed in the casing of FIG. 4.

As illustrated in FIG. 5, the forward perforated plate 3 is formed with a plurality of small perforations 3a which are located generally in a half section (in a left half section in FIG. 5) thereof. The forward perforated plate 3 is formed at its lower peripheral central portion with two distance projections 3c protruded rearward and at its upper end opposite sides portions with two engaging projections 3b which are protruded rearward by the same distance as the distance projections 3c and slightly laterally projected at their end part. The rearward perforated plate 3 has the same shape as the forward one but located turned front side rear, so that a plurality of small perforations 3a are formed in the half section (or in a right half section in FIG. 5) which is opposite to the half section of the forward perforated plate 3. In the rearward perforated plate 3, the distance projections 3c located at the lower peripheral central portion and the engaging projections located at the upper end opposite side portions are both protruded forward. The forward and rearward filter plates 4, 4 are of the same shape and formed thick as a whole except for its peripheral section which is formed thinner. The filter plate 4 has a flat front face with no projection, and provided at its lower end central portion with a cutout 4a and at its upper end opposite sides with engaging projections 4b, 4b in order to facilitate setting the filter plate 4 in position.

Figure 4:
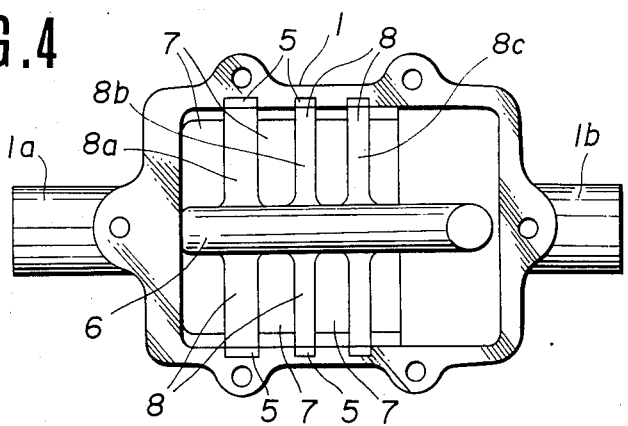
FIG. 4 is a plan view of a casing of the oil separator of FIG. 1, upon removal of a cover member.

The forward perforated plate 3 and the forward filter plate 4 are arranged in such a manner that the front face of the filter plate 4 are in contact with the engaging and distance projections 3b, 3c, in which the lower end edge of them is fitted in the wider foremost lateral groove 8, and the engaging projections of them are brought into engagement with step sections 5 formed at the top portion of the casing 1 as shown in FIG. 4. The lower end edge of the rearward perforated plate 3 is fitted in the middle groove 8 in which the engaging projections 3b thereof are brought into engagement with the step sections 5 formed at the top portion of the casing 1. Similarly, the lower end edge of the rearward filter plate 4 is fitted in the rearmost lateral groove 8 in which the engaging projections 4b thereof are brought into engagement with the step sections 5. Accordingly, the forward perforated plate 3 and the forward filter plate 4 are detachable relative to the casing 1 and vertically arranged so that their proper bodies are close to each other, while the forward perforated plate 3 and the rearward filter plate 4 are detachable relative to the casing 1 and vertically arranged to be separate from each other defining therebetween a wide space as illustrated in FIG. 1.

In addition, an elastic plate 9 is disposed on the top face of the casing 1. The elastic plate 9 is made of an elastomeric material such as rubber or plastics, and formed at its lower surface with a plurality of laterally extending projections 9a which defines three laterally extending grooves into which the upper end edges of the perforated and filter plates 3, 4 are fitted. A cover member 2 is placed on the elastic plate 9 to cover the upper opening of the casing 1 and fastened at its several portions to the casing 1 by means of screws (no numerals), so that the perforated and filter plates 3, 4 are biased downwardly through the elastic plate 9 to be tightly supported in position.

In order to actually use the thus configured oil separator, the oil separator is disposed in the blow-by gas recirculation line through which blow-by gas is supplied to the intake manifold in such a manner that the inlet and outlet pipes 1a, 1b are connected to the pipes constituting the blow-by gas recirculation line as shown in FIG. 1. Additionally, the oil return pipe 1c of the casing 1 is connected to the crankcase chamber.

The manner of operation of the thus configurated oil separator will be discussed hereinafter. During engine operation, blow-by gas leaking within the engine is introduced through the inlet pipe 1a to the interior of the casing 1 under the action of sucked intake air. The thus introduced blow-by gas first passes through the small perforations 3a formed at the left-half section of the forward perforated plate 3, so that the blow-by gas becomes of the state of spout and strikes against the forward filter plate 4 closely located rearward of the forward perforated plate 3. Then, the blow-by gas permeates the filter plate and passes through the same, and thereafter the gas stream of the blow-by gas is turned rightward to pass through the perforations 3a formed at the right-half section of the rearward perforated plate 3. The blow-by gas stream passed through the perforations 3a is increased in flow speed and strikes against the rearward filter plate 4 to permeate the filter plate to pass therethrough.

In the above-mentioned process in which the blow-by gas is flowing through the perforated and filter plates 3, 4, when the gas stream of blow-by gas increased in flow speed upon passing through the forward perforated plate 3 strikes against the porous filter plate 4, the gas is absorbed into the filter plate 4 in which oil droplets and mist adhere to the inside structure of the porous material of the filter plate 4. The thus adhering oil droplets and mist gradually move rearward under the action of the gas stream, in which the oil droplets and mist gradually coalesce and grow to form larger oil droplets. The thus formed larger oil droplets drop and flows in the longitudinal groove 6. Additionally, after the blow-by gas stream passes through the forward filter plate 4, separtion of the remaining oil droplets and mist can be promoted under the centrifugal force developed during rightward turning of the gas stream. Furthermore, the blow-by gas stream is repeatedly subjected to flow speed acceleration due to passing through the small perforations 3a of the rearward perforated plate 3 and oil droplet coalescence due to permeating the rearward filter plate 4, thus completing sufficient oil removal from the blow-by gas. Thus, the blow-by gas subjected to a sufficient oil separation will be supplied through the outlet pipe 1b into the intake manifold. The oil separated from the blow-by gas is gathered into the longitudinal groove 6 formed at the bottom wall B of the casing 1, and returns through the oil return pipe 1c into the crankcase chamber.

In order to disassemble the oil separator for maintenance and inspection purposes, the cover member 2 is detached upon removing the fastening screws, and thereafter the perforated and filter plates 3, 4 are drawn out upwardly, thereby accomplishing cleaning the inside of the casing 1 and replacing parts.

While two perforated plates and two filter plates have been shown and described in the above-discussed embodiment, it will be understood that the number of them may be suitably selectable in accordance with the displacement or capacity of the engine. The filter plate 4 may be formed of various porous materials other than the porous metal, which porous materials have a rigidity to maintain its shape and therefore may be a plastic porous material. Although the oil return pipe 1c of the casing 1 has been shown and described as formed to downwardly extend, it may be formed at the side of the casing bottom wall B to horizontally or laterally extend from the side portion of the casing bottom wall B.

Figure 6:
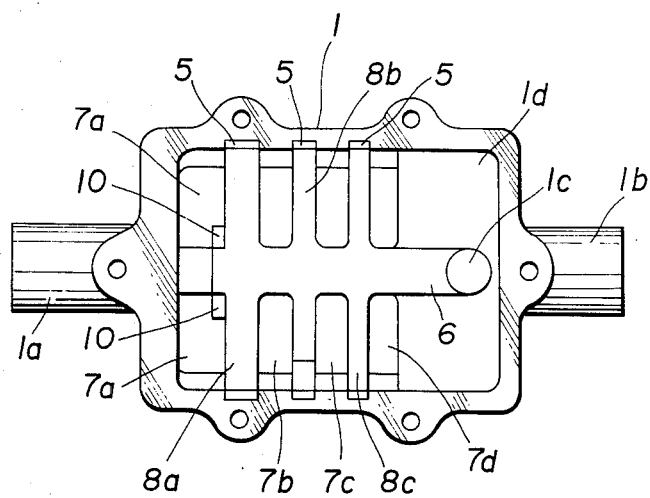
FIG. 6 is a plan view similar to FIG. 4 but showing another embodiment of the present invention.
Figure 7:
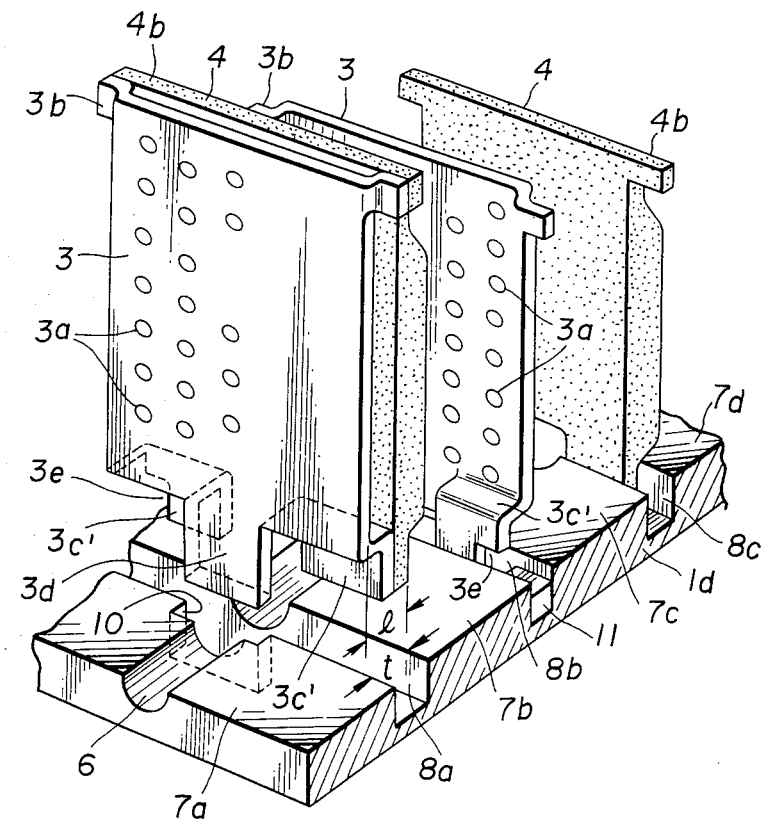
FIG. 7 is a perspective exploded view of an oil separating element housed in the casing of FIG. 6.
Figures 8, 9, 10, 11:
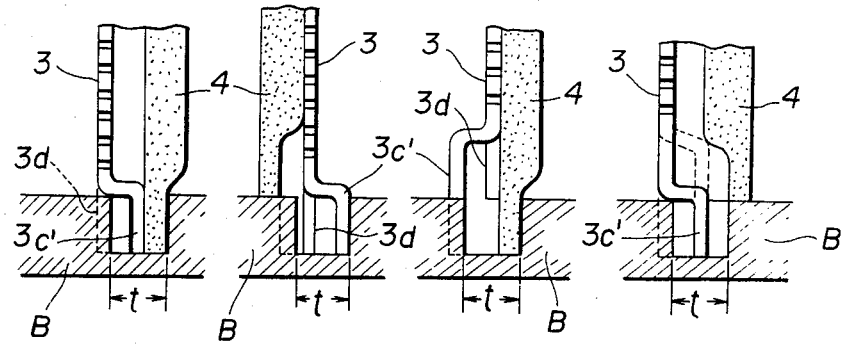
FIG. 8 is a fragmentary vertical sectional view of an essential part of FIG. 7.
FIGS. 9 to 11 are vertical sectional views similar to FIG. 8, but illustrating advantageous effect of the embodiment of FIG. 6.

FIGS. 6, 7 and 8 illustrate another embodiment of the oil separator of the present invention which is similar to the embodiment of FIGS. 1 to 5 except for the installation configuration of the perforated plates 3 relative to the lateral grooves 8. In this embodiment, the foremost rib 7a is formed at its central portion with a vertical groove 10 which has a predetermined width and merges in the foremost lateral groove 8a. Additionally, a step portion 11 is formed at its one end (at the right side end in FIG. 5) of the middle lateral groove 8b, the step portion having a height lower than the upper surface of the casing bottom wall B. The foremost perforated plate 3 is formed at its lower end edge with a central tongue member 3d whose width corresponding to that of the vertical groove 10 of the foremost rib 7a. The foremost perforated plate 3 is further formed at the opposite sides of the central tongue member 3d with two bent projections 3c' each of which is projected rearward and extends downward to have a L-shaped cross-section. The bent projection 3c' located opposite to the step portion 11 in the middle lateral groove 8b relative to the longitudinal groove 6 is formed with a cutout 3e which is engageable with the step portion 11.

The width t of the foremost lateral groove 8a is approximately equal to the thickness or distance l between the back side surface of the foremost perforated plate 3 and the back side surface of the lower end edge of the filter plate 4 in the state where the flat front face of the forward filter plate 4 is in contact with the bend projections 3c' and the engaging projections 3b of the forward perforated plate 3. The width of the middle lateral groove 8b is approximately equal to the thickness or distance between the front side face of the forward perforated plate 3 and the back side surface of the bend projection 3c' of the same. Additionally, the width of the rearmost lateral groove 8c is approximately equal to the thickness of the lower end edge of the filter plate 4.

Accordingly, when the forward perforated and filter plates 3, 4 are closely positioned as mentioned above so that their lower end edge sections fit in the foremost lateral groove 8a, the bent projections 3c' of the perforated plate 3 and the lower end edge of the filter plate 4 enter the foremost lateral groove while the central tongue member 3d of the forward perforated plate 3 fits in the vertical groove 10 as shown in FIG. 8, thus securely vertically supporting the forward perforated and filter plates 3, 4 in position. When the perforated plate 3 same as the forward perforated plate is located turned front side rear and fitted in the middle lateral groove 8b, both the central tongue member 3d and the bent projections 3c' enter the lateral groove 8b in which the cutout 3e of the one side bend projection 3c' is brought into engagement with the step portion 11 formed at one end of the middle lateral groove, so that the rearward perforated plate 3 is securely vertically supported in position. Additionally, the filter plate 4 same as the forward filter plate 4 is used as the rearward filter plate 4 and located in such a manner that its lower end edge is fitted in the rearmost lateral groove 8c thereby to securely vertically supporting the rearward filter plate 4 in position.

Now, in the process in which the forward perforated and filter plates 3, 4 are installed in position, the profile or the shape of the lower end of the combined one of the forward perforated and filter plates 3, 4 does not correspond or agree to the vertical cross-sectional shape of the foremost lateral groove to make impossible to install the forward perforated and filter plates 3, 4 in position when erroneously placed, for example, as shown in FIG. 9 in which the forward perforated and filter plates 3, 4 are reversely located in the fore and aft direction; as shown in FIG. 10 in which the forward perforated plate 3 is located turned front side rear; and as shown in FIG. 11 in which the forward filter plate 4 is located turned front side rear. Furthermore, if the plate same in shape as the forward perforated plate 3 is used as the rearward perforated plate 3 and be fitted in the middle lateral groove 8b without turning front side rear, the bend projection 3c' having no cutout 3e strikes against the step portion 11, so that the perforated plate 3 cannot be installed in position. Moreover, if the rearward filter plate 4 is located in the middle lateral groove 8b in place of the rearward perforated plate 3, its lower end strikes against the step portion 11 of the middle lateral groove 8b, thus preventing the filter plate 4 from being set in the middle groove 8b. Accordingly, with this embodiment, the perforated and filter plates can be accurately installed in position preventing them from being erroneously combined and erroneously located, thereby finally avoiding deterioration of oil separation function of the oil separator and engine troubles.

What is claimed is:

1. An oil separator for recycled blow-by gas, comprising:
   a casing having an inlet pipe for blow-by gas entrance, an outlet pipe for blow-by gas discharge, and an oil return pipe for separated oil discharge, said inlet and outlet pipes being located at first and second ends of said casing, respectively;
   first and second perforated plates disposed within said casing, said first perforated plate being located nearer to said casing first end than said second perforated plate, said first and second perforated plates having first and second perforated sections, respectively, which are located opposite to each other with respect to a longitudinal axis of said casing;
   first and second plate type filter members formed of a porous material and disposed within said casing, said first filter member being located between said first and second perforated plates, said second filter member being located nearer to said casing second end than said second perforated plate; and means defining a first space between said first perforated plate and said first filter member, and a second space between said second perforated plate and said second filter member, said second space being larger than said first space.

2. An oil separator as claimed in claim 1, further comprising means defining a third space between said first filter member and said second perforated plate, said third space being larger than said first space.

3. An oil separator as claimed in claim 2, further comprising means defining a fourth space between said second filter member and said casing second end, said fourth space being larger than said second space, said casing oil return pipe being opened to said fourth space.

4. An oil separator as claimed in claim 1, wherein said porous material is a three dimensional porous material having an inner structure by which small oil droplets coalesce.

5. An oil separator as claimed in claim 4, wherein said porous material is made of metal.

6. An oil separator as claimed in claim 1, wherein said first and second perforated plates and said first and second filter members are vertically and parallely aligned.

7. An oil separator as claimed in claim 1, wherein said casing has a bottom wall formed with first, second, and third lateral grooves each of which extends perpendicular to a vertical plane containing said casing longitudinal axis, said first perforated plate and first filter member fit in said first groove, said second perforated plate and said second filter member fit in said second and third lateral grooves, respectively.

8. An oil separator as claimed in claim 7, wherein said casing bottom wall is formed with a longitudinal groove extending parallely with said casing longitudinal axis and reaching said oil return pipe.

9. An oil separator as claimed in claim 1, wherein said first and second perforated sections of said first and second perforated plates are located symmetrical with each with respect to a vertical plane containing said casing longitudinal axis.

10. An oil separator as claimed in claim 1, wherein said first and second perforated plates and said first and second filter members are detachable relative to said casing.

11. An oil separator as claimed in claim 8, wherein said casing bottom wall is formed with first and second ribs between which said first lateral groove is defined, said first rib being located between said first lateral groove and said casing first end and having a vertical groove merging in said first lateral groove, and a step portion formed at a first end of said second lateral groove, in which said first perforated plate has at its lower end section a central tongue member engageable with said vertical groove, and first and second projections which are located on opposite sides of said central tongue member, each projection being projected rearward and engageable with said first lateral groove, and means defining a cutout engageable with said step portion, said cutout being located at said second projection which is located opposite to said step portion relative to a vertical plane containing said casing longitudinal axis.

12. An oil separator as claimed in claim 11, wherein said first, second, and third lateral grooves have such dimentions that the width of said first lateral groove is approximately equal to a distance between second face of said first perforated plate and second face of a lower end edge of said first filter member, said second faces facing said casing second end; the width of said second lateral groove is approximately equal to the thickness of a lower end edge of said perforated pate; and the width of said third lateral groove is approximately equal to the thickness of an end edge of said filter member.

* * * * *